US005477601A

United States Patent [19]

Jasmer

[11] Patent Number: 5,477,601

[45] Date of Patent: Dec. 26, 1995

[54] COMBINATION STAPLE GUN AND CUTTER AND METHOD OF USE

[76] Inventor: Arthur P. Jasmer, 7741 Doe Run, Orlando, Fla. 32810

[21] Appl. No.: 320,312

[22] Filed: Oct. 11, 1994

[51] Int. Cl.[6] .................... B23P 17/00

[52] U.S. Cl. .................... 29/417; 227/76; 227/120; 7/158

[58] Field of Search .................... 29/417, 432, 525.1, 29/798, 811.2, 816, 270; 7/158, 170; 227/76, 156, 120

[56] References Cited

U.S. PATENT DOCUMENTS

| | | | |
|---|---|---|---|
| 3,589,585 | 6/1971 | Cerioni | 227/76 |
| 3,596,820 | 8/1971 | Kwong Li Lou . | |
| 4,051,991 | 10/1977 | Goodchild | 227/156 |
| 4,087,035 | 5/1978 | Harmon | 227/120 |
| 4,706,869 | 11/1987 | Knispel et al. | 227/156 |
| 4,727,610 | 3/1988 | Lin . | |

FOREIGN PATENT DOCUMENTS

| | | | |
|---|---|---|---|
| 1450532 | 9/1976 | United Kingdom | 227/120 |

*Primary Examiner*—David P. Bryant
*Attorney, Agent, or Firm*—Elsie C. Turner

[57] ABSTRACT

A combination staple gun and tacker is provided which takes the place of two separate tools for stapling and cutting fiberglass tape used to tape various seams between sections of air-conditioning ductwork. Also provided is an improved method of of stapling and cutting fiberglass tape required to seal junctions of ductwork, employing the combination staple gun and tacker to staple the tape required on ductwork seams and to cut away the excess tape without tearing loose the newly-installed staples.

3 Claims, 1 Drawing Sheet

COMBINATION STAPLE GUN AND CUTTER AND METHOD OF USE

BACKGROUND OF THE INVENTION

This invention relates to a tool for use in the installation of air-conditioning ductwork. In a typical installation, there are a variety of seams or junctions of ductwork that are required to be wrapped with tape. The tape must be tacked or stapled in position, and then a mastic coating is painted over the tape to seal the junctions. The fabric used to wrap the joints is customarily woven fiberglass, available in long strips approximately three inches wide rolled onto spools. After stapling the fabric tape to a seam the installer then cuts the tape from the source. Previously the installer had to carry both a staple tacker and a knife. To cut the fiberglass tape the installer had to set aside the staple tacker in order to free both hands for the step of cutting away the excess tape. This is not as convenient or as fast as having one tool that can be used for both operations. Moreover because of the toughness of the fiberglass, it must be cut, not torn, and care must be taken that the newly installed staples are not pulled out of the ductwork by tension on the fabric as it is being cut. It is thus advisable to have a straight-edged cutting device to apply some retainzing pressure against the stapled tape on the ductwork to counter any pulling on the tape as it is being cut. An ordinary knife is not very suitable for this purpose.

A combination tool with staple-clenching means, tape dispenser and tape-cutter is the subject of U.S. Pat. No. 3,596,820 to Kwong Li Lou. However this device cannot possibly be used for taping air-conditioning ductwork. There is no way that a staple-clencher can be used on ductwork because the ductwork cannot be inserted between the staple-driving means and the base. Also, this device has a plethora of complex moving, pivoting parts that unnecessarily add to the cost of manufacture without increasing the tool's efficiency or usefulness.

Accordingly it is the purpose of the present invention to eliminate the above-mentioned cumbersome inconveniences and costly complex mechanisms, and to provide a simple cost-effective combination tool which enables the installer to more quickly and easily staple and cut the fabric used to tape duct seams.

SUMMARY

A primary objective of this invention is to provide a combination cutter-tacker tool which can take the place of two separate tools for stapling and cutting fiberglass tape used to tape various seams between sections of air-conditioning ductwork. Another object of this invention is to provide a more efficient method of stapling and cutting fiberglass tape fused to seal junctions of ductwork, which employs a single tool to tack place the tape required on ductwork seams and to cut away the excess tape without tearing loose the newly-installed staples.

DETAILED DESCRIPTION OF THE PREFERRED EMBODIMENTS

Figure 1:
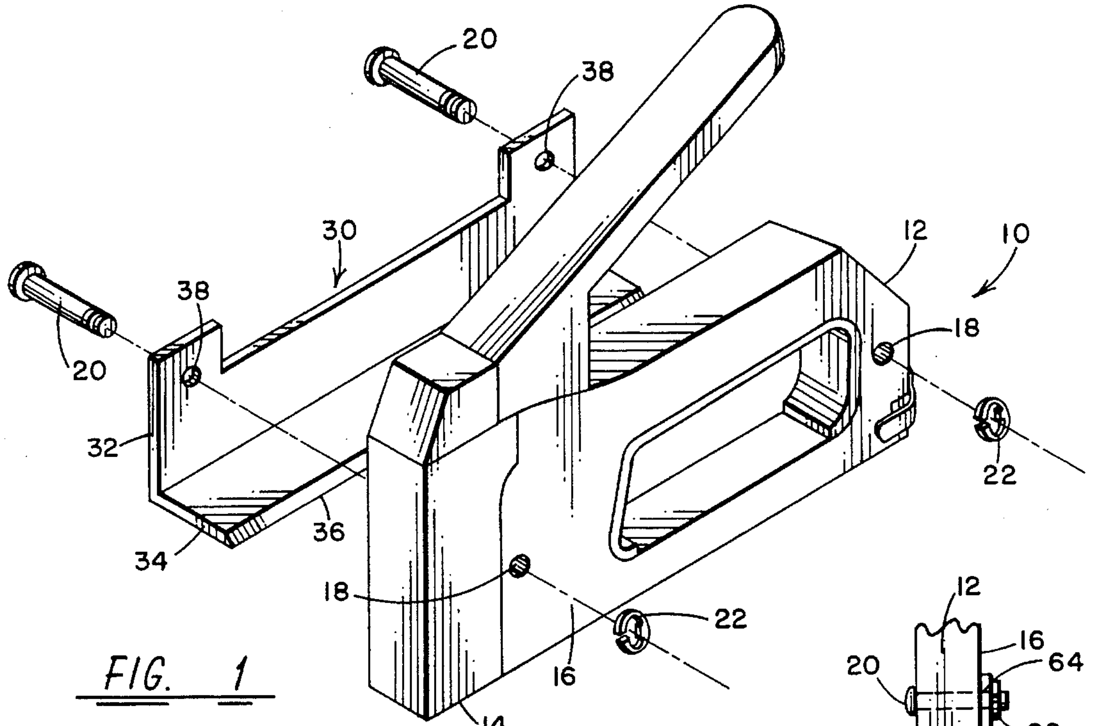
FIG. 1 is an exploded perspective view of one embodiment of the present invention.
Figure 2:
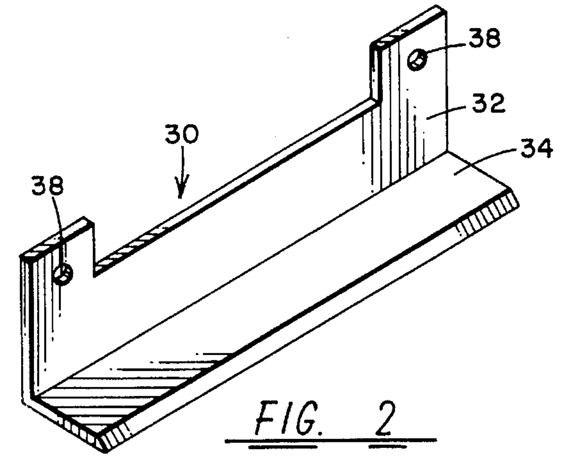
FIG. 2 is a perspective detail view of the cutter attachment of the present invention.
Figure 4:
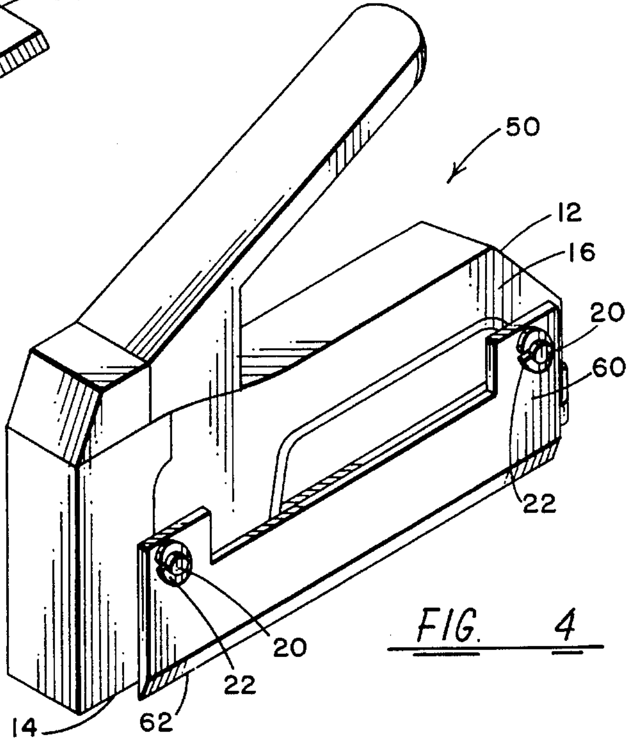
FIG. 4 is a perspective view of an alternative embodiment of the present invention.
Figure 3:
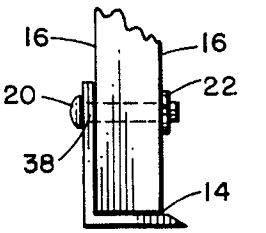
FIG. 3 is a partial front elevational view of the invention.

Referring to FIG. 1, it can be seen that one embodiment of the present invention 10 has conventional staple-tacking gun comprised of working parts, not shown, contained within a housing 12. There are a number of models of staple-tacking guns from different manufacturers that are available in hardware and building supply outlets. The working parts of these well-known tools include a staple magazine, a staple pusher to advance the staples within the magazine, a staple-driving mechanism employing a powerful spring, and a lever which triggers the staple-driver mechanism. Commonly, the floor of the staple magazine is the bottom surface of the gun. The staples are driven downward through a slot between the forward end of the magazine and the housing. A plurality of fastening pin means 20 hold the working parts and housing 12 together, the pins being inserted through pairs of aligned holes 18 in each side 16 of housing 12. These fasteners 20 are typically smooth bolts with heads at one end thereof and circumferential grooves at the other which accept small retaining C clamps 22 to hold the pins in place, although other fastening means such as rivets may be used in some applications. The combination of the present invention has a cutter attachment 30, shown in FIGS. 1 and 2, mounted on the housing 12. The cutter attachment 30 has a vertical portion 32 and a horizontal portion 34, L-shaped in cross-section. Vertical portion 32 abuts one side 16 of housing 12, and horizontal portion 34 abuts the bottom of the staple gun but does not cover the slot between the forward end of the staple magazine and the housing where staples exit when they are struck by the staple driving mechanism. Horizontal portion 34 has a cutting edge 36 aligned next to a bottom edge 14 of one of the sides 16 of the housing, as shown in FIG. 3. Mounting of cutter attachment 30 on the staple gun can be accomplished in several ways. It could be welded to one side 16 of the gun housing 12. Or it can be held in place by the pins 20 that hold the housing 12 and working parts together. The embodiment shown in FIG. 3 depicts vertical portion 32 with at least two spaced-apart holes 38 therethrough, each hole disposed to correspond in location to a pair of aligned holes 18 in each side 16 of the staple tacker, thereby permitting said cutter attachment to be mounted onto staple tacker with pins 20. FIG. 4 is an alternative embodiment of the invention, 50, with a cutter 60 comprising a simple flat blade mounted vertically on one side 16 of the stapler housing 12, with its cutting edge 62 protruding very slightly below the bottom edge 14 of side 16. This blade 60 also has at least two holes 64 disposed to correspond with the pairs of aligned holes 18 in sides 16 of the gun housing 12.

Figure 5:
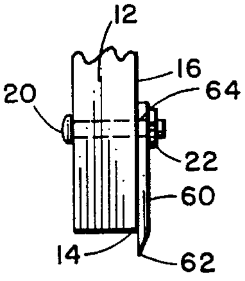
FIG. 5 is a partial front elevational view of the embodiment shown in FIG. 4.

It is to be noted that the thickness of the blades in both of the disclosed embodiments has been exaggerated in the drawings for the sake of more clearly depicting how the invention is constructed. Likewise, the distance the blade protrudes from the stapler in the embodiment of FIGS. 4 and 5 has also been exaggerated. In practice, neither of the blades interferes with the proper operation of the stapler.

In a typical installation, sheets of ductboard may be used to construct a box-like duct around an air-handler, and tubular ductwork sections may be joined end-to-end. Applicable building codes require that every seam in the ductwork be taped with appropriate fiberglass tape, the tape stapled in place, and mastic sealant applied onto the tape. The installer uses the present invention to tack staples tacking the tape in position along the seams, and at the completion of each tape application, simply presses the installed tape against the ductwork with the present invention so that the cutting edge lies across the fiberglass tape, and then draws the unused, free end of the tape across cutter blade to sever it from the installed tape in a well-known manner understood by all who have used tape or wrapping paper dispensers. Other uses of this versatile tool should be apparent to those skilled in the art.

I claim:

1. A multi-purpose tool for use in taping seams of air-conditioning ductwork, comprising:

staple-tacking gun means supported within a housing, said housing having a pair of vertical side walls, each side wall having a bottom edge; and cutter blade means having a cutting edge, said blade means mounted on said housing so that its cutting edge is aligned with and protruding from the bottom edge of one of said side walls, whereby a strip of tape used to wrap and seal seams of duct sections may be stapled to said duct sections by operation of said staple-tacking gun means, and unused supply of tape may be severed from said stapled tape by pulling said unused supply against said cutting edge.

2. The device according to claim 1 wherein said side walls of said housing are held together and to said staple-tacking means with fastening means, and said cutter blade is attached to said housing by said fastening means.

3. An improved method of attaching tape to seams of air-conditioning duct sections using a combination cutter-tacker tool, said tool comprised of:

staple-tacking gun means supported within a housing, said housing having a pair of vertical side walls, each side wall having a bottom edge; and cutter blade means having a cutting edge, said blade means disposed on said housing so that its cutting edge is aligned with and protruding from the bottom edge of one of said side walls, said method comprised of the following steps:

positioning a portion of tape from a supply source along a seam of air-conditioning duct sections;

attaching said portion of tape to said seam by driving staples through said tape into said sections using said staple-tacking means of said combination cutter-tacker;

severing said stapled portion of tape from its source of supply by pressing said cutter blade means of said combination cutter-tacker across said tape between said stapled portion and said source of supply and pulling the tape on the supply side across said cutter blade means.

* * * * *